UNITED STATES PATENT OFFICE.

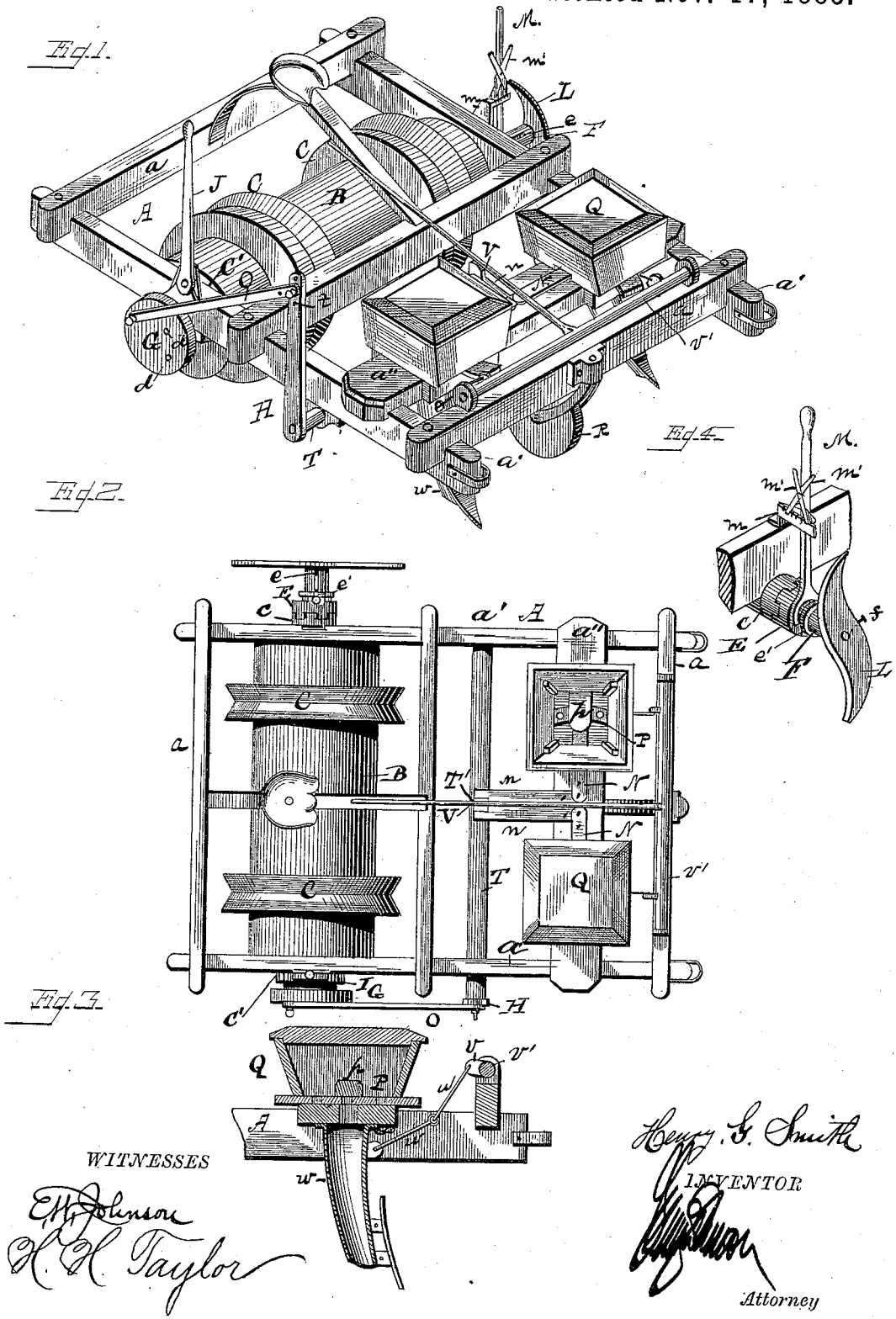

HENRY G. SMITH, OF HUTCHINSON, KANSAS, ASSIGNOR OF ONE-FOURTH TO CHARLES W. SNYDER, OF SAME PLACE.

SEED-PLANTER.

SPECIFICATION forming part of Letters Patent No. 330,806, dated November 17, 1885.

Application filed February 19, 1885. Serial No. 156,397. (No model.)

*To all whom it may concern:*

Be it known that I, HENRY G. SMITH, a citizen of the United States of America, residing at Hutchinson, in the county of Reno and State of Kansas, have invented certain new and useful Improvements in Seed-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in corn-planters; and my invention consists in the construction and combination of the parts, as will be hereinafter fully set forth, and specifically pointed out in the claims.

In the accompanying drawings, which illustrate my invention, Figure 1 is a perspective view; Fig. 2, a plan view; Fig. 3, a detail sectional view; and Fig. 4 is a detail view.

The general object of my invention is to provide an apparatus for planting and marking the ground, which will enable the operator to plant in straight rows each way, also to enable him, by the use of mechanism to be hereinafter described, to place the planter and seed dropping mechanism in a proper position, so that the seed will be dropped in line with each other both ways, the operating and seed dropping mechanism being provided with means whereby they can be readily thrown out of gear and adjusted when thrown in gear.

A represents the frame of the machine, which frame consists of longitudinal bars and crossbars $a\ a\ a'\ a'\ a'\ a''$, which are rigidly secured to each other at their points of intersection by bolts. To the rear portion of the frame A, between the longitudinal beams $a\ a$, is secured a roller or drum, B, which roller or drum consists of a hollow cylinder of any suitable construction, the heads C' of which cylinder are provided with hollow journals which extend through bearings or boxes attached to the under side of the longitudinal beams $a'$ of the frame A. The ends of these journals have rigidly attached thereto or formed integral therewith rims $c\ c'$, which form a portion of clutches. A center shaft, F, passes through the journals D D, attached to the head of the cylinder, and on the right-hand end of this center shaft is placed an eccentric wheel, G, which wheel is provided on its exterior with perforations $d\ d$. This eccentric wheel on its inner face is provided with a toothed wheel, I, and a hollowed-out portion with beveled rim, which fits over the rim $c'$, which is conical and makes, when the parts are forced upon each other, a substantial clutch, so that the position of the eccentric wheel G with relation to the center shaft, F, may be varied. The adjustments of the eccentric wheel are made by means of a lever, J, pivoted to the upper side of the frame, and this lever is provided at its lower end with segmental gear-teeth, which mesh with the cog-wheel, and by means of this lever the shaft F may be rotated so as to carry with it the cylinder B, or it may be rotated independent of the cylinder when the shaft F is slid to one side so as to disconnect the clutch. The shaft F is provided on its opposite end with a clutch, which consists of the rim $c$, which is notched, as shown, and a sleeve, E, which slides upon the shaft F, said sleeve being provided with a longitudinal slot, through which passes a pin, $e$, said pin also passing through the shaft F. The sleeve E is provided with a rim, $e'$, which is embraced by the forked end of the lever M, which lever is pivoted to a bracket, $m$, so as to be capable of a lateral movement, and by means of this lever the sleeve is slid in and out of engagement with the adjacent portion $c$ of the clutch. The pin $e$, which passes through the slot in the sleeve E, connects the cylinder B, through the medium of its journals, to the shaft F, so that when the clutches are in engagement the shaft will rotate with said cylinder. The cylinder B is provided with concave coverers C C, which are secured to the cylinder so as to be adjustable thereon, the object of making them adjustable being to keep them in line with the seed-spouts, which are also adjustable laterally.

To one end of the shaft F, on the right-hand side of the planter, is secured a marker, L, which is attached to the end of the shaft by means of a set-screw, $f$. The ends of this marker are curved, as shown in Fig. 4, so that the rounded edge thereof will enter the earth and leave a mark thereon. The distance between the marker and central portion of the adjacent coverer is normally equal to the distance between each of the coverers attached to the cylinder B.

Attached to the upper side of the cross-bar $a''$ is a plate or casting, which is adjustable longitudinally thereon. To the under side of this plate are hinged seed-spouts $w$, which are connected, by means of links or rods $u$ $u$, to projections $v$, formed on a rock-bar, $v'$, said rock-bar being journaled in upwardly-projecting brackets attached to the upper edge of the forward beam. This rock-bar is provided with an operating-lever, V, which extends rearwardly, so as to be within reach of the driver. It will be seen that by elevating the lever V the seed-spouts may be raised out of contact with the ground when it is desired to transport the machine from place to place. The lower portion of the seed-spouts are provided with reversible shovels.

To the central portion of the machine, immediately in the rear of the seed-boxes Q, is pivoted a rock-shaft, T, which is provided at its outer end with a rigidly-attached crank-arm, H, and centrally on a line with said crank-arm with an upwardly-projecting portion, T'. The crank-arm H, at the outer end of the rock-shaft T, is provided with perforations $t$, and is connected by a pivot-bolt to the rod O, which is also provided with a pivot-pin, which enters one of the perforations in the eccentric wheel G. The central projecting portion, T', of the rock-shaft T has attached thereto bars $n$ $n$, which are pivotally connected to the horizontal levers N N, which are secured by vertical bolts to the frame $a''$. The outer ends of these levers or arms N are attached pivotally to segmental seed slides or valves P, which are provided with perforations, through which the seed passes from the boxes Q. These segmental valves slide in grooves formed in the upper part of the casting W, and project through openings in the lower portion of the sides of the seed-boxes.

The seed-slides P are partially covered by central plates, $p$.

The ends of the bars $n$ $n$ and levers N N where they are connected to each other are provided with perforations for the purpose of making the necessary adjustments when the seed-boxes are moved laterally upon the supporting-beam $a''$, and the upper portion of the projection on the rock-shaft is also provided with a series of perforations.

The front portion of the planter is supported by a caster-wheel, R, which is attached to a bracket secured to the front portion of the cross-beam $a$.

The bracket $m$, to which the lever M is pivoted, is serrated on its upper edge and provided with pivoted levers $m'$, which engage with the ratchets and hold the lever from lateral displacement in either direction.

The operation of my invention is as follows: When the apparatus is drawn across the field, and the clutches are in position, so that they will engage, the rotary motion of the cylinder is imparted to the disk or wheel G, which operates, through the medium of the rod and crank-arm, the rock-shaft. Motion is communicated from the rock-shaft, through the medium of the arms $n$ N, to the seed-slides. Should the seed not be dropped in its proper position as indicated by the markers, by moving the clutch which engages with the lever N, so as to disengage its parts, the rotation of the disk G will be stopped, and said disk can be moved to a proper position by the lever J.

It will be seen from the foregoing that the operator, while sitting upon the seat, will be able to plant in rows which will cross each other at right angles, and that he is also enabled to adjust the seed-dropping mechanism so as to correspond with the marker.

I claim—

1. The combination, in a seed-planter, of a supporting-frame composed of side and end bars, a cylinder located between said side bars and provided with a central independent shaft bearing in journals on the under side of said side bars, clutching devices located on said cylinder and shaft causing them to revolve in common, a disk, G, located on one end of said shaft, a shaft, T, journaled in bearings in the forward part of the frame, carrying an arm connected eccentrically to said disk by a rod, O, coverers C, carried by said roller, seed-hoppers located at the front of the machine and provided with curved slides P, arms M, attached thereto, and bars N, connecting said arms with the shaft T to reciprocate said slides, substantially as set forth.

2. The combination, in a corn-planter, of a shaft, $v'$, journaled in bearings at the front of the frame, seed hoppers and slides, and devices for operating the latter, drill-spouts pivoted beneath said hoppers, and links connecting said spouts with said shaft $v'$ independent of said seed-slides, and a lever for operating said shaft.

In testimony whereof I affix my signature in presence of two witnesses.

HENRY G. SMITH.

Witnesses:
J. P. DILLON,
WM. GIBSON.